United States Patent [19]

Slough

[11] Patent Number: 5,027,050
[45] Date of Patent: Jun. 25, 1991

[54] MULTIPLE BATTERY SYSTEM

[76] Inventor: Warren H. Slough, 410 Mickle Towers, 200 Mickle Blvd., Camden, N.J. 08103

[21] Appl. No.: 145,590

[22] Filed: Jan. 7, 1988

[51] Int. Cl.$^5$ .............................................. H02J 7/00
[52] U.S. Cl. ....................................... 320/61; 320/15; 320/14
[58] Field of Search ....................... 320/61, 13, 15, 14; 322/1, 4, 100

[56] References Cited

U.S. PATENT DOCUMENTS 3,845,835  11/1974  Petit .................................. 320/61 X
4,287,428   9/1981  Smith ................................. 320/61 X

FOREIGN PATENT DOCUMENTS 0103869  6/1983  Japan ..................................... 320/2
0514351  1/1938  United Kingdom ................... 320/61

Primary Examiner—R. J. Hickey

[57] ABSTRACT

A new and improved electric generating system comprising a plurality of electrical devices interconnected and assembled so as to convert low voltage direct current into high voltage alternating current in a continuous noninterruptable and self relying flow. This system is a battery powered unit continuously sustained by a automatic battery recharging proceedure.

3 Claims, 1 Drawing Sheet

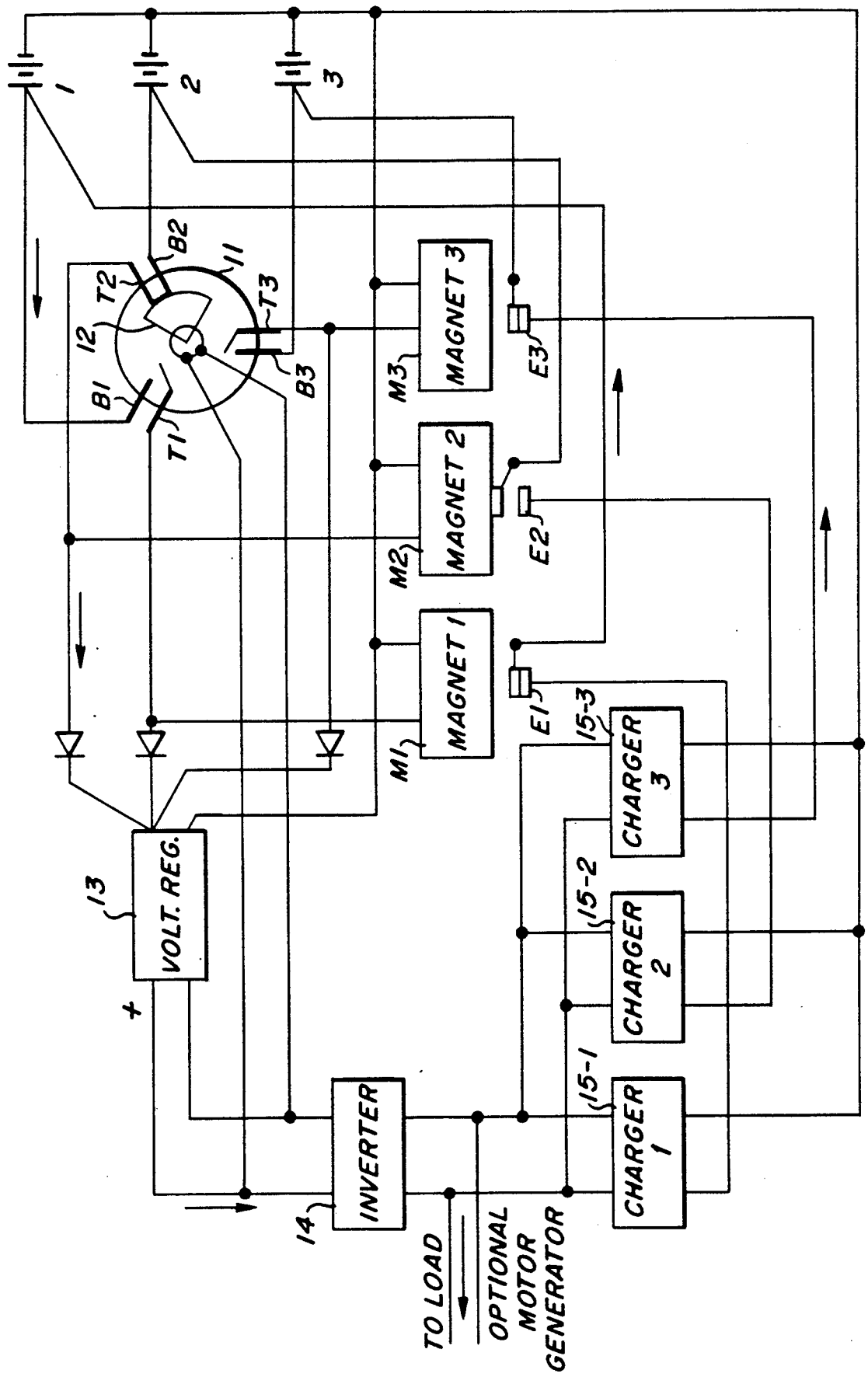

MULTIPLE BATTERY SYSTEM

BACKGROUND OF THE INVENTION

The present invention responds to the economic and conservation demands for a dependable source of electrical energy, particularly with regard to remote areas wherein commercial electric service is either nonexistant or economically impractical.

SUMMARY OF THE INVENTION

It is a principle objective of this invention to provide a self relying electric generating system converting low voltage direct current into high voltage alternating current as a new and economic source of electric energy to comply with the demand of a house or the like.

It is also a objective of this invention to provide a a electric generating system wherein, by means of a reciprocating circuit a separate yet interdependent source of electrical energy to power this system is generated within the system and thereby eliminating the need for a additional or secondary power source.

DESCRIPTION OF THE EMBODIMENT

This electric generating system is powered by three rerechargable batteries, each is connected to a corrosponding terminal (B1, B2, B3) on the rim of the distributor. (11) Adjacent terminals (T1, T2, T3) have circuit connections with inhibiting diodes to the inverter (14) through the voltage regulator (13) and circuits to respective electromagnets. (M1, M2, M3) Each magnet is juxtaposed with a dual ferrous element with a circuit to the out put of it's respective battery charger, (15-1, 2, 3) while the upper half of the element (E) connects with a corresponding battery through a indibiting diode. A circuit on the out put of the inverter (14) directs current to each battery charger. (16-1, 2, 3,)

The rotation —1rph— of the motorized collar (12) energized by a circuit from the voltage regulator, (13) closes and opens the circuit at each terminal union on the distributor; when closed, the battery connected to the terminal involved energizes both the inverter and the corresponding electromagnet (M-1, 2, 3,) thereby attracting the upper half of the element (E) from the lower half to disconnect the battery involved from it's battery charger (15-1, 2, 3,) causing said battery to supply power for the system while the remaining two batteries are recharging. Given the fact that full recharge time has been calculated to equal at least twice that of power time, each battery is required to supply only one-third of the total hourly opperational power to assure that said battery is not discharged below ampere hour capacity and that the next battery in the cycle is fully charged.

Selectively, a 240 amp motor-generator can be connected to the out put of the inverter or, if the electrical demand is at a minimum, a direct circuit connection to the inverter (14) will be adaquate.

I claim:

1. A battery powered electric generating system converting low voltage direct current into high voltage alternating current of a value to comply with the demand of a house or the like by means to include:
   (a) a battery bank of multiple high ampere rechargable storage batteries to power a inverter;
   (b) a high ampere static inverter;
   (c) a distributor having a motorized rotating collar and multiple pairs of dual terminal units to couple each battery, in succession, with the inverter and corresponding electromagnets;
   (d) multiple high ampere battery chargers;
   (e) electromagnets and circuit breakers for coupling corresponding battery chargers with corresponding batteries.

2. The system of claim 1, where in the distributor automatically dispenses current from specific batteries of the battery bank to simultaneously energize the inverter and the electromagnets in response to the advance of the rotating collar.

3. The system of claim 1 where in charging current is applied to corresponding batteries through circuit breakers.

* * * * *